United States Patent [19]

Brennecke

[11] 3,806,578
[45] Apr. 23, 1974

[54] PURIFICATION OF PENTAERYTHRITOL TRINITRATE BY CRYSTALLIZATION
[75] Inventor: Henry M. Brennecke, Woodstown, N.J.
[73] Assignee: E. I. du Pont de Nemours and Company, Wilmington, Del.
[22] Filed: June 30, 1960
[21] Appl. No.: 40,100

[52] U.S. Cl.............................. 260/467, 260/707
[51] Int. Cl............................................. C07c 77/02
[58] Field of Search ............ 260/466, 467, 703, 707

[56] References Cited
UNITED STATES PATENTS

| | | | |
|---|---|---|---|
| 3,408,383 | 10/1968 | Rolewicz | 260/467 |
| 2,024,396 | 12/1935 | Smith | 260/707 |
| 2,204,059 | 6/1940 | Acken | 260/467 |
| 2,671,118 | 3/1954 | Gangwer | 260/707 |
| 2,870,211 | 1/1959 | Miller et al. | 260/707 |

OTHER PUBLICATIONS

"The Condensed Chemical Dictionary," 4th Ed., Reinhold Pub. Corp., N.Y. (1950)

Primary Examiner—Leland A. Sebastian

EXEMPLARY CLAIM

1. A process for the purification of pentaerythritol trinitrate which comprises adding water to a solution of pentaerythritol trinitrate in methylene chloride, cooling, with agitation, the mixture thus formed to a temperature between about −10° and about +10°C., and separating the purified pentaerythritol trinitrate in the form of hydrate crystals from the solution, the weight ratio of said methylene chloride being between about 0.5 and about 2 parts for each part of pentaerythritol trinitrate and the weight ratio of said water being at least 1 part for each 50 parts of pentaerythritol trinitrate.

5 Claims, No Drawings

PURIFICATION OF PENTAERYTHRITOL TRINITRATE BY CRYSTALLIZATION

The present invention relates to a process for purifying crude pentaerythritol trinitrate.

Pentaerythritol trinitrate prepared by the reaction of pentaerythritol with mixed acid usually contains at least five percent impurities, that is, predominantly pentaerythritol dinitrate and tetranitrate. The presence of the dinitrate and tetranitrate impurities in pentaerythritol trinitrate have presented many difficulties when this compound is used in various applications. For example, when pentaerythritol trinitrate containing dinitrate is used in the preparation of pentaerythritol trinitrate acrylate, the dinitrate crosslinks with the acrylate to give an undesirable product. Also, the presence of solid pentaerythritol tetranitrate in liquid pentaerythritol trinitrate interferes in the preparation of plastisol propellants. There is no satisfactory method known in the prior art to purify pentaerythritol trinitrate except by cumbersome chromatographic methods. Therefore, a simple purification process for crude pentaerythritol trinitrate is needed.

Accordingly, an object of this invention is to provide a novel purification process for crude pentaerythritol trinitrate which is simple and economical.

I have found that the foregoing object is achieved by a simple process whereby sufficient water is added to a solution of crude pentaerythritol trinitrate in methylene chloride to form crystalline pentaerythritol trinitrate hydrate, and the crystals are separated from the solution.

In accordance with this invention, the purification process comprises adding water to crude pentaerythritol trinitrate in methylene chloride, cooling the stirred mixture to a temperature between about $-10°$ and $+10°C.$, and separating the colorless pentaerythritol trinitrate hydrate crystals formed from the methylene chloride. If substantially water-free pentaerythritol trinitrate is desired, the water of crystallization from the colorless pentaerythritol trinitrate hydrate crystals may be removed by drying to obtain substantially water-white liquid pentaerythritol trinitrate having a purity of at least 98 percent.

The following examples, in which the parts are by weight, illustrate the process of the invention and are not to be construed as limiting the invention in any manner. The crude pentaerythritol trinitrate used in the examples was yellow in color and was obtained by the reaction of pentaerythritol with mixed acid in the presence of methylene chloride as solvent.

Example 1

To a solution of 300 parts of liquid crude pentaerythritol trinitrate (Analysis: pentaerythritol trinitrate, 95.2percent; pentaerythritol tetranitrate, 2.1 percent; pentaerythritol dinitrate, 2.7 percent) in 200 parts of methylene chloride was added 5 parts of water. The solution, while being stirred, was cooled to $-2°C.$ during a period of 120 minutes. Colorless pentaerythritol trinitrate hydrate crystals formed (157 parts; water in crystals 2.39 percent) and were filtered from the solution. To remove the water of crystallization, the hydrate crystals were dissolved in 600 parts of dry methylene chloride and the mixture distilled until the boiling point reached 50°C. (approximately a 50 percent solution). The moisture content of the solution was 0.05percent.

The analysis of the pentaerythritol trinitrate portion in the solution obtained was as follows:
Pentaerythritol trinitrate, — 98.4%
Pentaerythritol tetranitrate, — 0.5%
Pentaerythritol dinitrate, — 1.1%

Example 2

To a solution of 300 parts of liquid crude pentaerythritol trinitrate, having the same composition as that in Example 1, in 300 parts of methylene chloride was added 5parts of water. The solution, while being stirred, was cooled to $-5°C.$ during a period of 30 minutes. Colorless pentaerythritol trinitrate hydrate crystals formed (190 parts; water in crystals, 1.56 percent) and were filtered from the solution. The crystals were washed with icecold methylene chloride. The analysis of the substantially water-white liquid pentaerythritol trinitrate obtained was as follows (on a water- and solvent-free basis):
Pentaerythritol trinitrate, — 98.5%
Pentaerythritol tetranitrate, — 1.2%
Pentaerythritol dinitrate, — 0.3%

Example 3

Approximately 100 parts of a 50 percent solution of pentaerythritol trinitrate in methylene chloride was shaken with 10 parts of water, and the mixture was cooled in an ice bath to 5 °C. The thick slurry was filtered to give a mass of fine white crystals. The crystals were dried under high vacuum to give substantially water-white liquid pentaerythritol trinitrate which analyzed as follows:
Pentaerythritol trinitrate, — 98.0%
Pentaerythritol tetranitrate, — 1.4%
Pentaerythritol dinitrate, — 0.6%

As can be seen from the examples, crude pentaerythritol trinitrate is purified by crystallization of the hydrate from methylene chloride and separation of the colorless crystals from the methylene chloride. Liquid purified pentaerythritol trinitrate was obtained by drying the crystals to remove the water of crystallization.

Critical in the process is the use of water to form a hydrate with the pentaerythritol trinitrate. Generally, at least one part of water by weight should be provided for each 50 parts of pentaerythritol trinitrate. The solubility of water in methylene chloride at ambient temperatures is only about 0.14 percent. However, when pentaerythritol trinitrate is present in the methylene chloride, additional water will be dissolved in the solution, the additional amount being that which combines with the pentaerythritol trinitrate to form the hydrate. Experimental evidence indicates that pentaerythritol trinitrate hydrate can consist of 2,3, or 4 moles of pentaerythritol trinitrate per mole of water, depending upon the amount of water present, the solvent used, and the conditions of crystallization. For the purposes of this invention, the composition of the hydrate is not material, inasmuch as it has no effect on the purity of the final product.

The purification process of the invention is based on the lower solubility of the hydrate in methylene chloride at low temperatures. It is known that pentaerythritol trinitrate is miscible with methylene chloride and cannot be crystallized from methylene chloride by cooling. Only a slush results when a pentaerythritol trinitrate-methylene chloride solution is cooled to low temperatures. On the other hand, we have found that pentaerythritol trinitrate hydrate is soluble in methylene chloride solutions at elevated temperatures, i.e., about 30°C.; but, at lower temperatures, the hydrate becomes less soluble in methylene chloride solutions and crystallizes out. The presence of excess water, i.e., water which has not combined to form hydrate, at temperatures at about 0°C. does not interfere with the crystallization of the hydrate. Water in the form of ice is less dense than methylene chloride and will float while the hydrate precipitates out. However, the use of excess water is not preferred.

Inasmuch as methylene chloride is the preferred solvent in the esterification of pentaerythritol to the trinitrate, it is conveniently used in the purification process of the invention. The preferred amount of methylene chloride present is between about 0.5 and about 2 parts by weight for each part of pentaerythritol trinitrate. When more than 2 parts of methylene chloride are present for each part of pentaerythritol trinitrate, more of the hydrate remains in the cooled solution. When less than 0.5 part methylene chloride is present for each part of pentaerythritol trinitrate, the cold slurry of crystals is viscous and difficult to handle. The presence of 1 part by weight of methylene chloride for 1 part of pentaerythritol trinitrate is particularly preferred in the purification process of the invention.

Temperatures between about −10° and +10°C. have been found to be most suitable in the process of the invention. At temperatures above 10°C. the hydrate is more soluble in the methylene chloride solution and the crystallization times are longer. Temperatures below −10°C. may be used but because of the excess ice formation, no advantage entails therefrom. Preferably, the solution is cooled to about 0°C. after the addition of water.

The pentaerythritol trinitrate hydrate crystals formed may be separated from the liquid by any conventional method; for example, filtration is particularly convenient.

If substantially water-free purified pentaerythritol trinitrate is desired, water of crystallization may be removed from the pentaerythritol trinitrate hydrate crystals by any suitable drying method, for instance, exposure at room temperature to drying agents, such as calcium and magnesium sulfates, which are inert to pentaerythritol trinitrate. The pentaerythritol trinitrate hydrate crystals may be melted and exposed to the drying agent at room temperature or the crystals first may be dissolved in a dry inert organic solvent and exposed to the drying agent at room temperature, followed by removal of the solvent. An alternate drying method, as exemplified, is dissolution of the hydrate crystals in the dry inert organic solvent and distillation of the resulting mixture.

The present invention has been described in detail in the foregoing. However, it will be apparent that many variations may be introduced without departure from the scope of the invention. I intend, therefore, to be limited only by the following claims.

I claim:

1. A process for the purification of pentaerythritol trinitrate which comprises adding water to a solution of pentaerythritol trinitrate in methylene chloride, cooling, with agitation, the mixture thus formed to a temperature between about −10° and about +10°C., and separating the purified pentaerythritol trinitrate in the form of hydrate crystals from the solution, the weight ratio of said methylene chloride being between about 0.5 and about 2 parts for each part of pentaerythritol trinitrate and the weight ratio of said water being at least 1 part for each 50 parts of pentaerythritol trinitrate.

2. A process as claimed in claim 1, wherein the pentaerythritol trinitrate hydrate crystals are dried to remove the water of crystallization.

3. A process as claimed in claim 1, wherein the said temperature is about 0°C.

4. A process as claimed in claim 1, wherein the weight ratio of said methylene chloride to pentaerythritol trinitrate is one to one.

5. A process as claimed in claim 1, wherein the weight ratio of water to pentaerythritol trinitrate is 1.5 parts for each 50 parts of pentaerythritol trinitrate.

* * * * *